(12) United States Patent
Eserkaln et al.

(10) Patent No.: US 7,419,589 B2
(45) Date of Patent: Sep. 2, 2008

(54) ADAPTABLE WATER PURIFICATION APPARATUS

(75) Inventors: Paul Eserkaln, Duluth, GA (US); Cuahutemoc H. Acevedo, Sugar Hill, GA (US)

(73) Assignee: Bio-Lab, Inc., Lawrenceville, GA (US)

( * ) Notice: Subject to any disclaimer, the term of this patent is extended or adjusted under 35 U.S.C. 154(b) by 268 days.

(21) Appl. No.: 10/923,251

(22) Filed: Aug. 19, 2004

(65) Prior Publication Data
US 2005/0150823 A1 Jul. 14, 2005

Related U.S. Application Data

(63) Continuation-in-part of application No. 10/681,579, filed on Oct. 8, 2003, now Pat. No. 7,083,717.

(60) Provisional application No. 60/417,326, filed on Oct. 9, 2002.

(51) Int. Cl.
*B01F 1/00* (2006.01)
*C02F 1/76* (2006.01)

(52) U.S. Cl. .................. 210/167.11; 210/205; 137/268; 422/275; 422/279; 422/281

(58) Field of Classification Search ......... 422/274–275, 422/261, 264, 266, 277–279, 281–283; 239/310, 239/312, 314, 316–317; 210/205–206, 289, 210/267.11; 134/93; 137/263
See application file for complete search history.

(56) References Cited

U.S. PATENT DOCUMENTS

| 1,152,769 | A | * | 9/1915 | Trent | 422/225 |
| 2,738,323 | A | * | 3/1956 | Tepas, Jr. | 422/274 |
| 2,820,701 | A | * | 1/1958 | Leslie | 422/279 |
| 3,266,870 | A | * | 8/1966 | Cianflone, Jr. | 422/263 |
| 3,460,562 | A | * | 8/1969 | Moulder | 137/268 |
| 3,864,090 | A | * | 2/1975 | Richards | 422/269 |
| 4,250,911 | A | * | 2/1981 | Kratz | 137/268 |
| 5,759,501 | A | * | 6/1998 | Livingston et al. | 422/275 |
| 7,081,232 | B1 | * | 7/2006 | Dooley et al. | 422/261 |

* cited by examiner

*Primary Examiner*—Terry K Cecil
(74) *Attorney, Agent, or Firm*—Jaimes Sher (57) ABSTRACT

A water purification apparatus connected to a water system includes a hopper for holding chemical tablets on a perforated bed and an underlying basin. A spray head is detachably connected to the perforated bed and sprays water onto the tablets and parallel to the perforated bed. The basin receives the water through the perforated bed. Because the hopper allows for the use of different spray head designs, the rate at which water is introduced to the tablets, and thus the chemical output, may be modified by replacing one spray head for another having a different number of spray nozzles or having spray nozzles of a different size or shape. Consequently, the hopper of the present invention may be used for delivering the proper concentration of a variety of water treatment chemicals.

13 Claims, 10 Drawing Sheets

Fig_5

Fig_6

Fig_8

Fig_10

Fig_9

Fig. 11

Fig_12

Fig_13

ADAPTABLE WATER PURIFICATION APPARATUS

RELATED APPLICATIONS

This application is a continuation in part of U.S. patent application Ser. No. 10/681,579 filed Oct. 8, 2003, now U.S. Pat. No. 7,083,717 which claims the benefit of priority of U.S. provisional application Ser. No. 60/417,326, filed Oct. 9, 2002, which are relied on and incorporated herein by reference.

FIELD OF THE INVENTION

The present invention relates to a water purification apparatus for treating water with chemicals to kill bacteria or other microorganisms. More particularly, the present application relates to a water purification apparatus for feeding chlorine or other chemicals to a body of water such as in a swimming pool, a spa, cooling towers, drinking water, and the like. Further, the water purification apparatus of the present invention is adaptable for delivering a proper concentration of a variety of water treatment chemicals.

BACKGROUND OF THE INVENTION

It is desirable to treat water before it can be utilized in such applications as recreational swimming, bathing in hot tubs, drinking water, and also industrial uses such as cooling tower systems which employ large quantities of water. Chlorine has been used as the most common chemical for treating confined bodies of water to fight microorganisms such as bacteria which can contaminate the bodies of water and make them unsafe for contact by humans.

Modern systems for treating water, particularly recreational swimming pools, use dissolvable tablets as a chlorine source, such as calcium hypochlorite tablets. Such dissolvable tablets represent a convenient way to treat the water in swimming pools and spas.

In treating confined bodies of water such as swimming pools or hot tubs, regulation of the amount of chlorine added to the body of water is an important consideration. The addition of too little chlorine may result in the failure to eliminate sufficient numbers of harmful microorganisms. The addition of too much chlorine may result in adverse effects upon swimmers or bathers. Consequently, a chlorinator must be able to adjust the concentration of chlorine added to the body of water. In addition, in the context of a residential swimming pool, the chlorinator must require little maintenance. Further, because concentrated chlorine is toxic, the chlorinator must be safe to operate and maintain.

SUMMARY OF THE INVENTION

The present invention addresses the above identified system attributes by providing a water purification apparatus, particularly a chlorinator, for treating a body of water, such as a swimming pool, by adding chlorine to the body of water by means of a water re-circulation system associated with the body of water. The chlorinator of the present invention derives chlorine from a source of chlorine, such as dissolvable tablets of calcium hypochlorite and delivers the chlorine in the proper concentration to the body of water through the re-circulation system. By adding chlorine to the re-circulation system of the body of water, the chlorinator of the present invention adjusts the concentration of chlorine in the body of water. The chlorinator of the present invention is constructed so that its requires little maintenance. Further, the chlorinator of the present invention is safe to operate and maintain.

Particularly, the chlorinator of the present invention includes a hopper for holding the solid, dissolvable chlorine source tablets and an underlying basin. The hopper has a top opening for receiving the dissolvable tablets and a perforated bed for supporting the dissolvable tablets within the hopper. A spray head with a number of spray nozzles, generally four, is supported by the perforated bed at the bottom of the hopper. The spray nozzles are generally directed horizontal and therefore parallel to the plane of the perforated bed. The spray head is connected to the re-circulation system of the body of water via an inlet port and a spray nozzle control valve.

In another embodiment, the spray head is detachably connected to the perforated bed so that the same hopper may be used for various spray head designs. In this embodiment, the rate at which water is introduced to the dissolvable tablets, and thus the chemical output, is easily modified by replacing one spray head for another having a different number of spray nozzles or having spray nozzles of a different size or shape. Consequently, the hopper of the present invention may be used for delivering the proper concentration of a variety of water treatment chemicals. For example, the hopper of the present invention can be used to deliver calcium hypochlorite, BCDMH, TCCA, or any other treatment chemical known in the art by virtue of the hopper being adapted to receive various spray heads, wherein each spray head may have a design that is optimal for the particular chemical being delivered.

The underlying basin is positioned below the perforated bed and receives water from the spray head that has percolated through the tablets in the hopper above. The basin also has a number of rinse nozzles around its inside perimeter which are connected to the re-circulation system of the body of water via the inlet port, a rinse nozzle control valve, and a float valve. The float valve is controlled by a float located within the basin. Water is drawn from the basin by a pump or other suction device, such as a venturi, and the water is delivered to the re-circulation system via an outlet port.

The basin also has a water level sensor switch and an overflow port. The water level sensor switch and the overflow port represent backup systems for the float valve to assure that the basin does not overflow upon the failure of the float valve or if it does overflow the water is directed through the overflow port to a predesignated safe location.

The hopper of the chlorinator has a hinged lid covering the top opening. The rim of the top opening of the hopper has a concave cut out which is dimensioned to match the radius of a standard container in which the dissolvable tablets are sold. Consequently, the standard container fits in the concave cut out thereby minimizing the chance of spillage as the tablets are transferred from the container into the hopper. The hinged lid of the hopper has a matching convex protrusion which engages the concave cut out to thereby complete the seal by the lid around the opening of the hopper. In addition, a lid switch is mounted at the hinge of the lid. When the lid is opened, the lid switch disables the spray control valves, so that water will not be delivered to the spray nozzles while the lid is open and tablets are being poured into the hopper.

The chlorinator also has a component compartment adjacent the bottom of the basin. The component compartment houses the discharge pump, the spray nozzle control valve, the rinse nozzle control valve, control valve circuitry, and the plumbing for the inlet port, the outlet port, the spray head, the rinse nozzles, and the overflow port. The component compartment has an access panel which is connected to the component compartment by screws. An access panel for the spray head is positioned on the front of the hopper and attached by screws adjacent a spray head access switch for shutting down the chlorinator when the spray head access panel is removed.

In response to a call for additional chlorine to be added to the body of water, the spray nozzle control valve opens so that water flows from the re-circulation system through the inlet port and to the spray head. The four nozzles on the spray head spray water parallel to the plane of the perforated bed and into a layer of tablets adjacent the perforated bed. As the water contacts the dissolvable tablets, chlorine is added to the water and the water with its added concentration of chlorine drips through the perforated bed into the basin below.

Also in response to a call for additional chlorine to be added to the body of water, the discharge device connected to the basin begins discharging water from the basin through the outlet port back into the re-circulation system of the body of water. The discharge device discharges the water from the basin at the same rate as water is added to the basin through the spray head, rinse nozzles, and float valve. In order to maintain a reservoir of water in the basin, makeup water from the re-circulation system is added to the basin via the inlet port, the rinse nozzle control valve, the float valve, and the rinse nozzles. The float valve controls the amount of water added to the basin through the rinse nozzles as the float moves up and down with the water level in the basin. In addition, the rinse nozzles are directed against the sides of the basin to inhibit the buildup of deposits from the water in the basin.

Further objects, features and advantages will become apparent upon consideration of the following detailed description of the invention when taken in conjunction with the drawing and the appended claims.

DETAILED DESCRIPTION OF THE PREFERRED EMBODIMENT

Figures 1, 2:
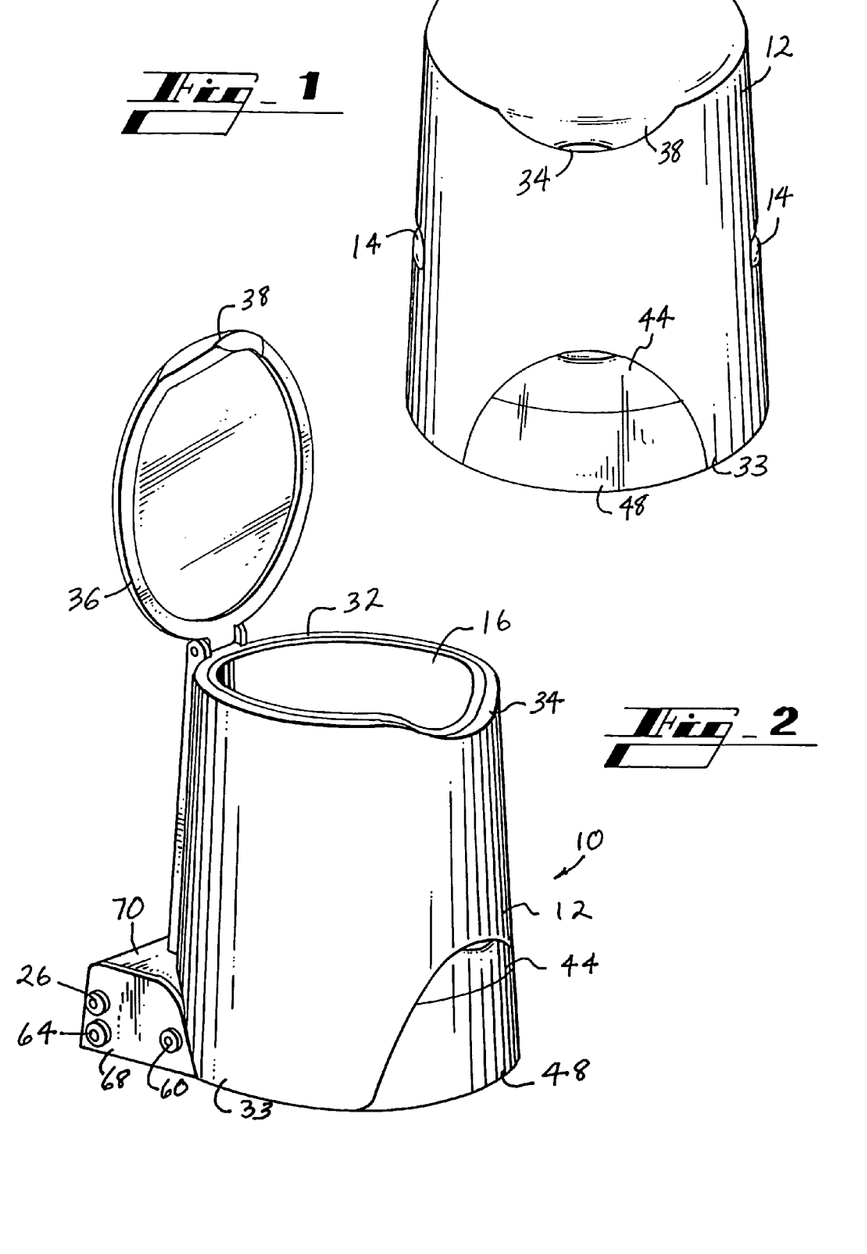
FIG. 1 is a front perspective view of the water purification apparatus with the lid closed in accordance with present invention.
FIG. 2 is a side perspective view of the water purification apparatus with the lid open in accordance with present invention.

Referring now to the drawings, in which like reference numerals represent like parts throughout the several views, FIG. I shows a water purification apparatus or chlorinator 10. The chlorinator 10 is connected to a re-circulation system for a body of water such as for example a swimming pool, a hot tub, a spa, or a cooling tower. The re-circulation system is conventional and typically includes a re-circulation pump (not shown), which draws water from the body of water, passes the water through filters, and returns the water to the body of water. The chlorinator 10 is connected in parallel with the re-circulation system so that some of the water in the re-circulation system can be diverted through the chlorinator 10 in response to a call for additional chlorine to be added to the body of water.

Figure 4:
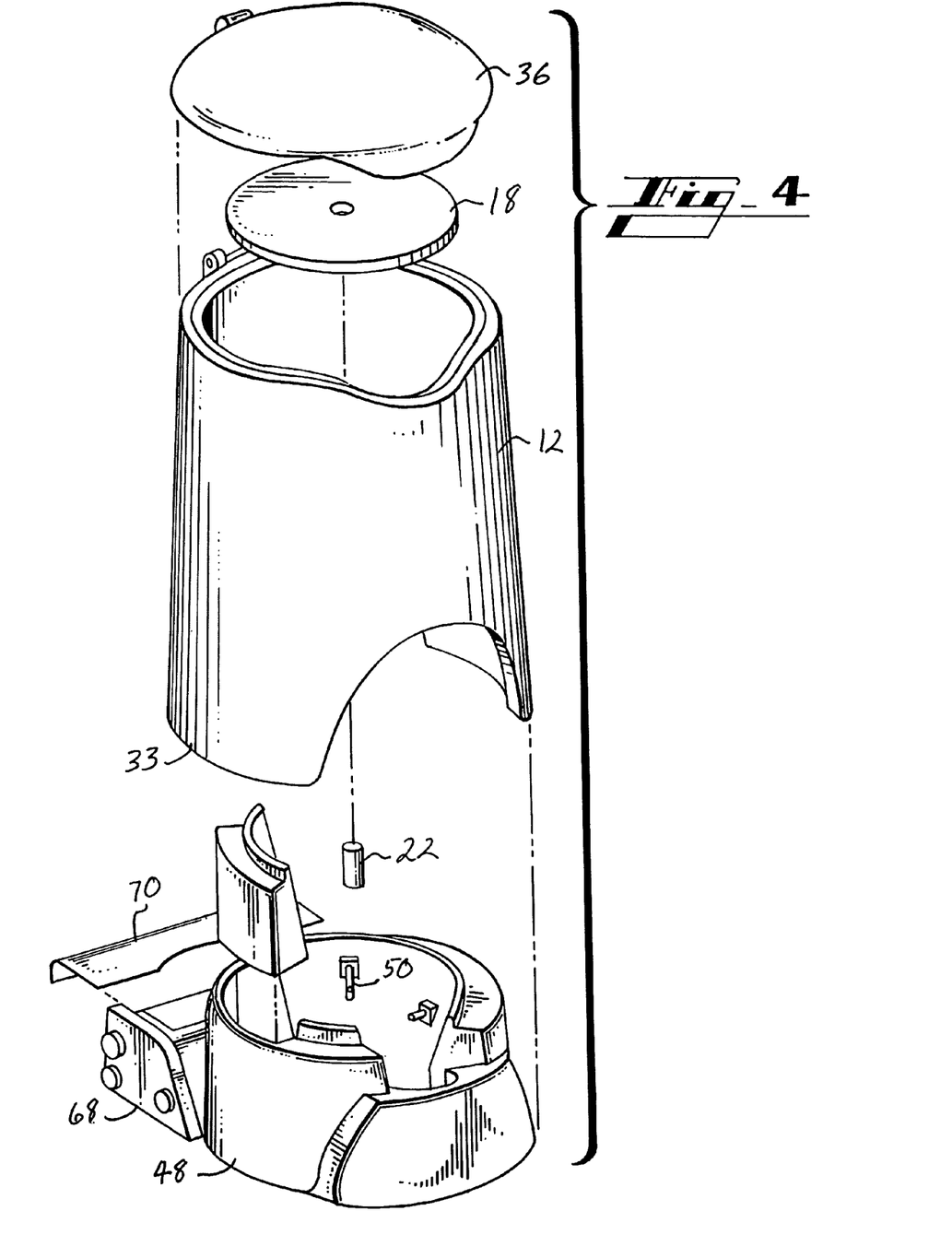
FIG. 4 is a side exploded view of the water purification apparatus in accordance with present invention.
Figure 5:
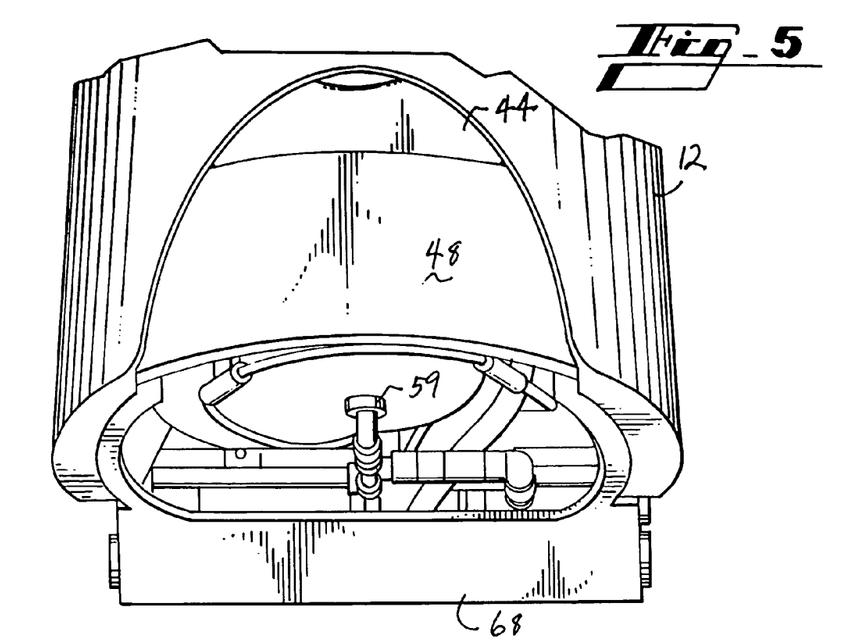
FIG. 5 is a bottom perspective view of the water purification apparatus with the spray head access panel closed in accordance with present invention.
Figure 9:
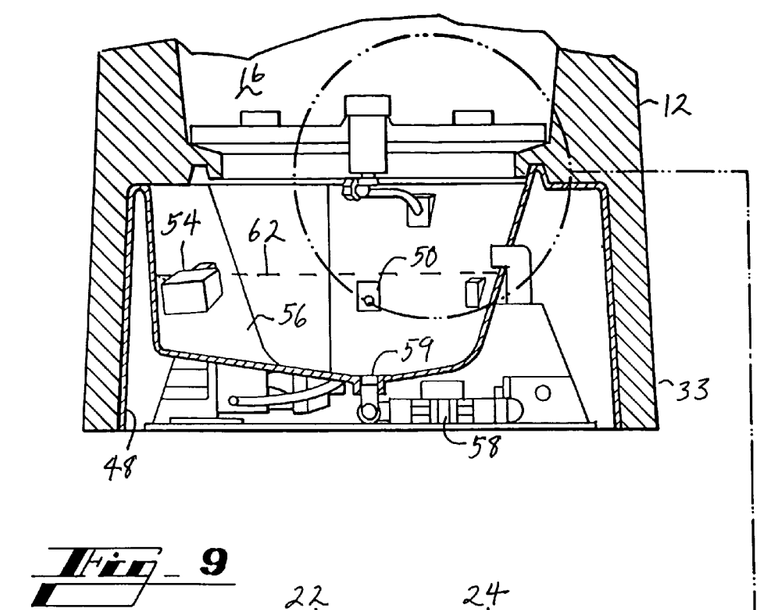
FIG. 9 is a side cross-section view of the water purification apparatus in accordance with present invention.

With continuing reference to FIG. 1, the chlorinator 10 comprises a hopper 12, and a lower basin 48. A component compartment 68 is connected to the basin 48. The hopper 12 is of molded plastic with an internal chamber 16, a top opening 32, and a lower skirted portion 33 that fits over the basin 48 as best seen in FIG. 4. Lift handles 14 are molded into the outside of the hopper 12 to facilitate lifting the chlorinator 10 and lifting the hopper 12 off of the basin 48. As best seen in FIG. 9, a perforated bed 18, with perforations 20, is supported on an annular lip 17 within the internal chamber 16. The perforated bed 18 forms the bottom of the internal chamber 16. The perforated bed 18 supports water dissolvable chemical tablets 30 which provide the chemical, typically chlorine, for addition to the body of water.

Figure 3:
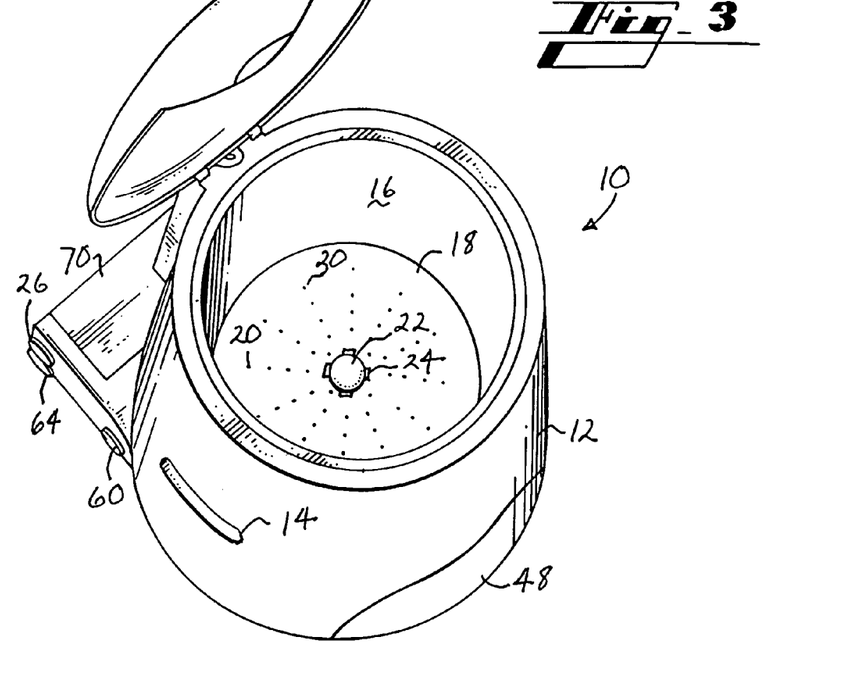
FIG. 3 is a top perspective view of the water purification apparatus with the lid open in accordance with present invention.

The hopper 12 has the top opening 32 and a lid 36 mounted to the top opening 32 by means of a hinge 40. With reference to FIGS. 2 and 3, the top opening 32 has a concave cutout 34, and the lid 36 has a matching convex protrusion 38. The concave cutout 34 has a radial dimension that coincides with the radius of a standard retail bucket container in which the chemical tablets 30 used in the chlorinator 10 are sold. Consequently, the standard retail bucket container can be nestled in the concave cutout 34 when the chemical tablets 30 are added to the internal chamber 16 thereby inhibiting spillage. Once the lid 36 is closed, the protrusion 38 fits into the concave cutout 34 so that the lid 36 seals the hopper 12 around the opening 32. The hopper 12 is constructed to hold approximate 200 pounds of the chemical tablets 30.

Figure 7:
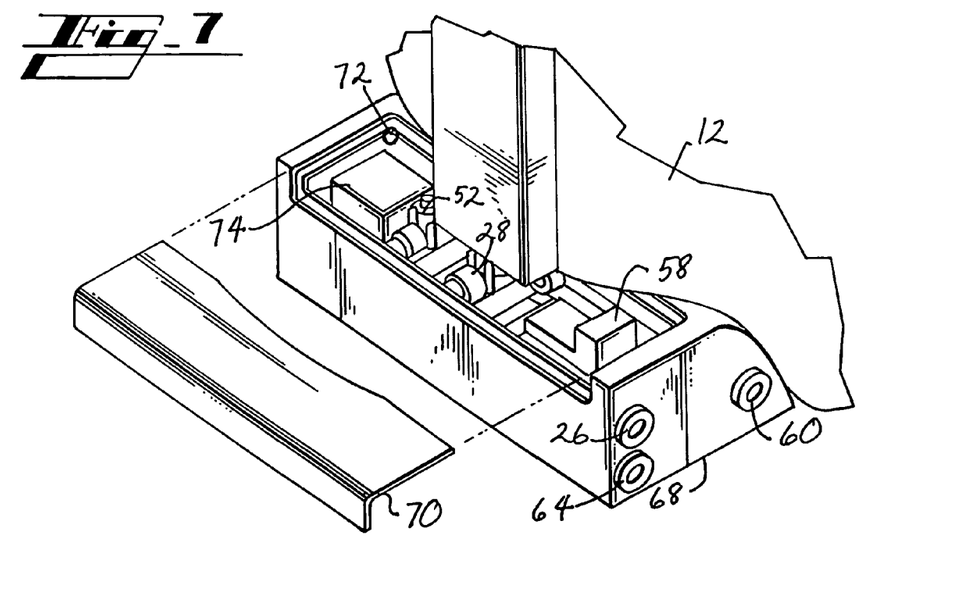
FIG. 7 is a rear perspective view of the water purification apparatus with the components access panel open in accordance with present invention.
Figure 11:
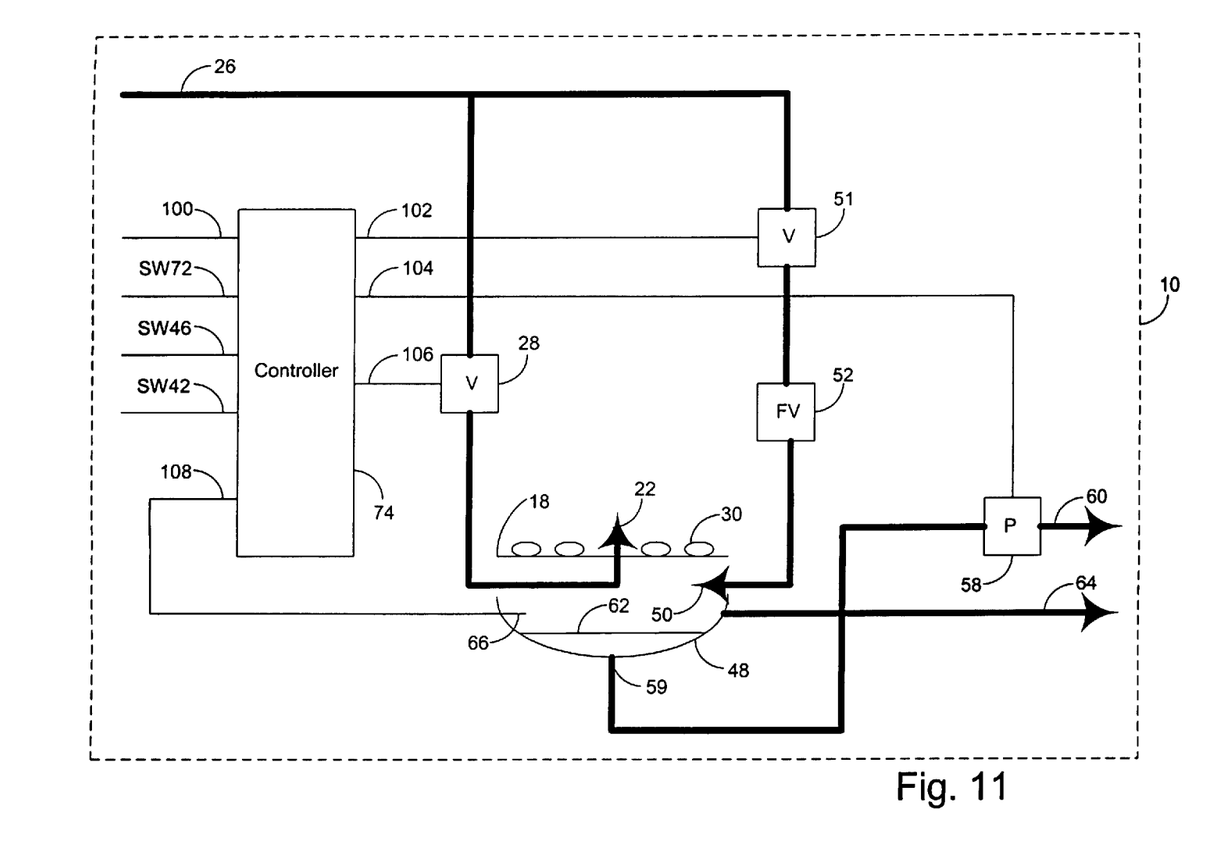
FIG. 11 is a schematic diagram of the chlorinator in accordance with present invention.

The perforated bed 18, with perforations 20, has a spray head 22 mounted in the center of the perforated bed 18. The spray head 22 has four horizontally directed spray nozzles 24 located around its periphery. The spray head 22 is connected to the re-circulation system via an inlet port 26 and a spray nozzle control valve 28 (FIGS. 7 and 11). The inlet port 26 and the spray nozzle control valve 28 are located in the component compartment 68. The spray nozzles 24 are directed horizontally and parallel to the plane of the perforated bed 18 for two purposes. First, the horizontal direction of the spray limits the wetting of the tablets 30 to a limited region adjacent the perforated bed 18. Consequently, the mass of tablets 30 within the hopper 12 are not all wetted at the same time, and therefore will not cake together creating the possibility of a bridge over the perforated bed. Second, the horizontal direction of the spray reduces the chances that water may be sprayed out of the top opening 32 of the hopper 12 if the lid 36 is not properly closed or the safety devices, to be explained later, fail to operate when the hopper lid is open for the addition of tablets 30.

The basin 48 is located below the perforated bed 18 in order to receive water that has been sprayed by the spray nozzles 24, has percolated through the tablets 30, and has passed through the perforations 20. The basin 48 is molded plastic and has rinse nozzles 50 spaced around the inside periphery of the basin 48. The rinse nozzles are connected to the re-circulation system via the inlet port 26, rinse nozzle control valve 51, and float valve 52 (FIGS. 7 and 11). The rinse nozzle control valve 51 is located in the component compartment 68 to provide service access. A discharge device or pump 58 is connected to a basin drain 59. The discharge pump 58 extracts water from the basin 48 and discharges the water through an outlet port 60 to the re-circulation system of the body of water. The discharge pump 58 discharges water from the basin 48 faster than the water enters the chlorinator 10 through the spray head 22.

Figure 8:
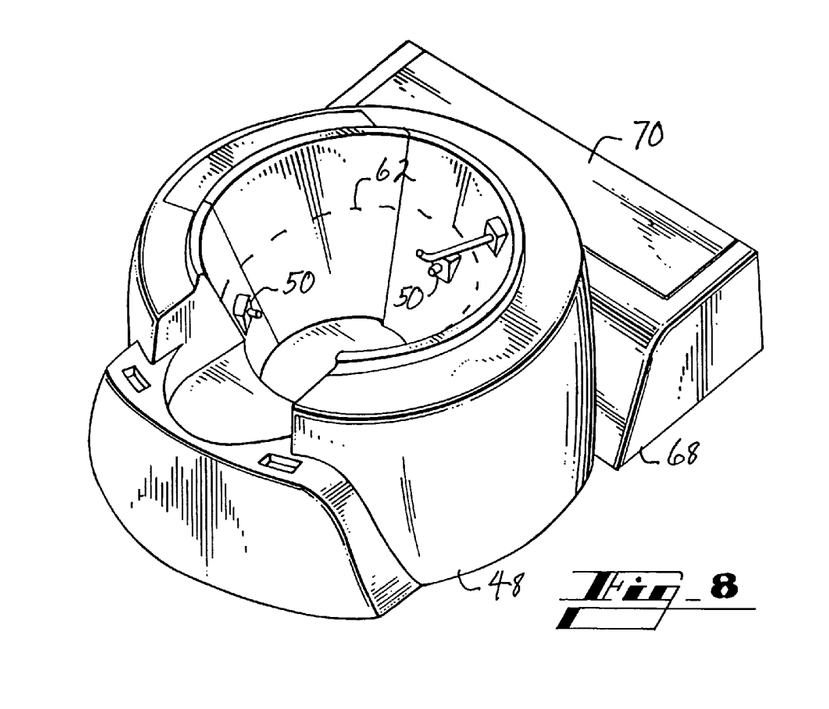
FIG. 8 is a front perspective view of the basin of the water purification apparatus with the hopper removed in accordance with present invention.

The rinse nozzles 50 in the basin 48 perform two functions. First, the rinse nozzles 50 spray the inside surfaces of the basin 48 to inhibit the buildup of precipitated material from the water. Second, the rinse nozzles 50 provide makeup water to the basin 48 so that the water dripping through the perforated bed 18 and the makeup water from the rinse nozzles 50 maintain the water in the basin at a predetermined water line 62 (FIGS. 8 and 9) while the water is being withdrawn from the basin 48 by the discharge pump 58. The water level in the basin 48 is maintained at the water line 62 by means of a float 54 located in a float chamber 56. The float 54 controls a float valve 52 which in turn allows makeup water flow into the basin through the rinse nozzles 50 when the water level drops below the predetermined water line 62 as water is being withdrawn by the discharge pump 58. The basin 48 also has a water level cut off switch 66 and an overflow port 64. The water level cut off switch 66 is mounted inside the basin at a point above the predetermined water line 62. If the float valve 52 fails and the water rises above the water line 62 and contacts the water level cut off switch 66, the water level cut off switch 66 will deactivate spray nozzle control valve 28 and rinse nozzle control valve 51 thereby limiting further rise in the water level in the basin 48. If both the float valve 52 and the water level cut off switch 66 fail, the rising water will be discharged from the basin 48 through an overflow port 64. The overflow port 64 is connected to a pipe (not shown) which leads to a safe disposal for the overflowing water.

Figure 6:
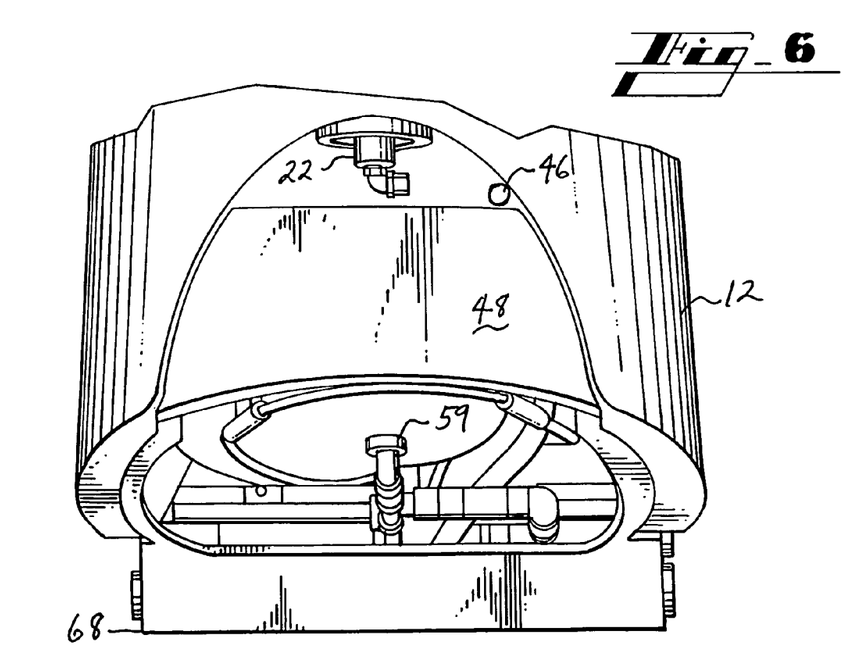
FIG. 6 is a bottom perspective view of the water purification apparatus with the spray head access panel open in accordance with present invention.
Figure 10:
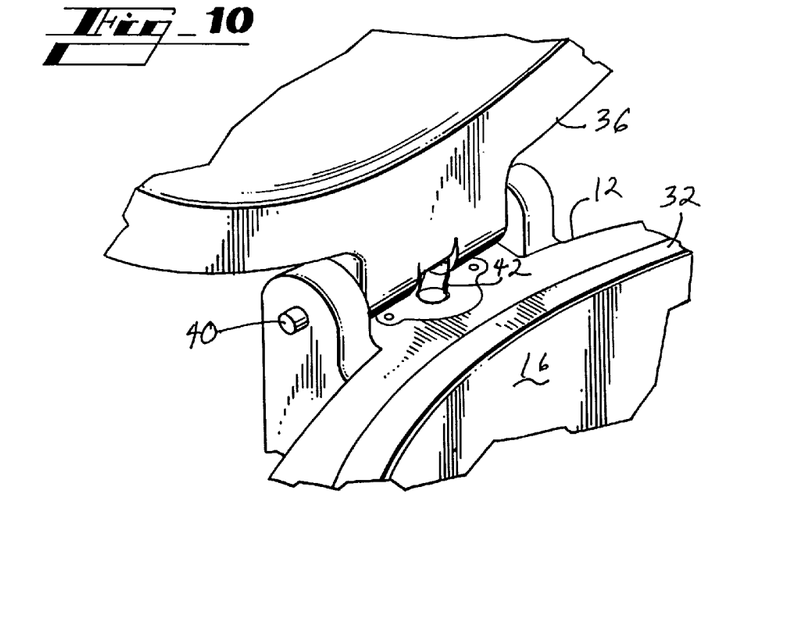
FIG. 10 is a detailed perspective view of the hopper lid switch for the hopper lid in accordance with the present invention.

The chlorinator 10 provides access to the components in the component compartment 68 through a removable component access panel 70. The access panel 70 has a component switch 72 (FIG. 7) positioned adjacent the screws that hold the access panel 70 in place. When the component access panel 70 is removed, the component switch 72 senses the absence of the access panel 70 and sends a signal SW72 to a controller 74 (FIG. 11) which in turn cuts off water to the chlorinator 10 and shuts off the discharge pump 58 as will be described in greater detail. Similarly, access to the spray head 22 is gained through spray head access panel 44. The access panel 44 has a spray head switch 46 (FIG. 6) positioned adjacent the screws that hold the spray head access panel 44 in place. When the spray head access panel 44 is removed, the spray head switch 46 senses the absence of the spray head access panel 44 and sends a signal SW46 to the controller 74 (FIG. 11) which in turn cuts off water to the chlorinator 10 and shuts off the discharge pump 58 as will be described in greater detail. The top opening 32 of the hopper 12 has a lid switch 42 (FIG. 10) adjacent the hinge 40 for the lid 36. When the lid 36 is open, the lid switch 42 senses that the lid is open and sends a signal SW42 to the controller 74 (FIG. 11) which in turn cuts off water to the chlorinator 10 and shuts off the discharge pump 58 as will be described in greater detail.

The operation of the chlorinator 10 is best understood by reference to the schematic diagram of FIG. 11. In FIG. 11, the bold lines represent water flow through the chlorinator 10 from the inlet port 26 to the outlet port 60. In FIG. 11, the water from the re-circulation system enters the chlorinator 10 through the inlet port 26. The spray nozzle control valve 28 connects the water from the re-circulation system to the spray nozzles of the spray head 22. Similarly, the rinse nozzle control valve 51 connects the water to the float valve 52 which in turn connects the water to the rinse nozzles 50. The water discharged from the spray nozzles of the spray head 22 and the water discharged from the rinse nozzles 50 collected in the basin 48. The pump 58 extracts the water in the basin 48 through the basin drain 59 and discharges the water back to the re-circulation system through the outlet port 60. The controller 74 controls the operation of the spray nozzle control valve 28, the rinse nozzle control valve 51, and the pump 58.

When a chlorine sensor (not shown) in the body of water determines that additional chlorine is required for the body of water, the chlorine sensor sends a call signal to the controller 74 on line 100. In response to the call signal on line 100, the controller 74 sends an activate signal to the spray nozzle control valve 28 on line 106 which opens the spray nozzle control valve 28 to allow water to flow through the spray nozzles of spray head 22. At the same time in response to a call signal on line 100, the controller 74 sends an activate signal to the rinse nozzle control valve 51 on line 102 which opens the rinse nozzle control valve 51 to allow water to flow through the rinse nozzles 50. Also in response to a call signal on line 100, the controller 74 sends an activate signal to the discharge pump 58 on line 104.

As previously described, the water from the spray nozzles of spray head 22 wet the tablets 30 on the perforated bed 18, and then the water percolates through the perforated bed 18 into the basin 48 below. The spray nozzles of the spray head 22 are sized such that they introduce water into the basin 48 at a rate less than the rate at which the pump 58 removes water from the basin 48 via the basin drain 59. Consequently, makeup water is provided through the rinse nozzles 50 into the basin 48 to maintain the water in the basin 48 at the predetermined water line 62. The float valve 52 controls the amount of water to the rinse nozzles 50 to maintain the water level in the basin in equilibrium at the water line 62 as long as the pump 58 is running.

Once chlorine sensor (not shown) determines that the chlorine concentration in the body of water has been raised to a predetermined level, the call signal on line 100 disappears and the controller 74 deactivates the spray nozzle control valve 28 via signal on line 106, the rinse nozzle control valve 51 via a signal on line 102, and the pump 58 via a signal on line 104. The chlorinator 10 then waits for the next call signal on line 100 before the chlorination operation is resumed.

In addition to the call input on line 100, the controller 74 receives inputs SW72, SW46, and SW42 from the switches 72, 46, and 42 respectively as previously described. When the controller 74 receives a signal from any one of the switches 72, 46, and 42, the controller 74 deactivates the spray nozzle control valve 28, the rinse nozzle control valve 51, and the pump 58 as previously described. As result, when maintenance personnel have removed either access panel 70 or 44 or have opened the lid 36, flow of water into or out of the chlorinator 10 is inhibited. In addition, operation of the chlorinator 10 is inhibited whenever the water level cut off switch 66 is activated by a high water level in the basin 48. The output of the water level cut off switch 66 is connected to the controller 74 via line 108. In response to the signal on line 108, the controller 74 deactivates the spray nozzle control valve 28, the rinse nozzle control valve 51, and the pump 58 as previously described. Upon the failure of the float valve 52 and the water level cut off switch 66, the rising water in the basin 48 flows out of the overflow port 64 for safe disposal.

Figure 12:
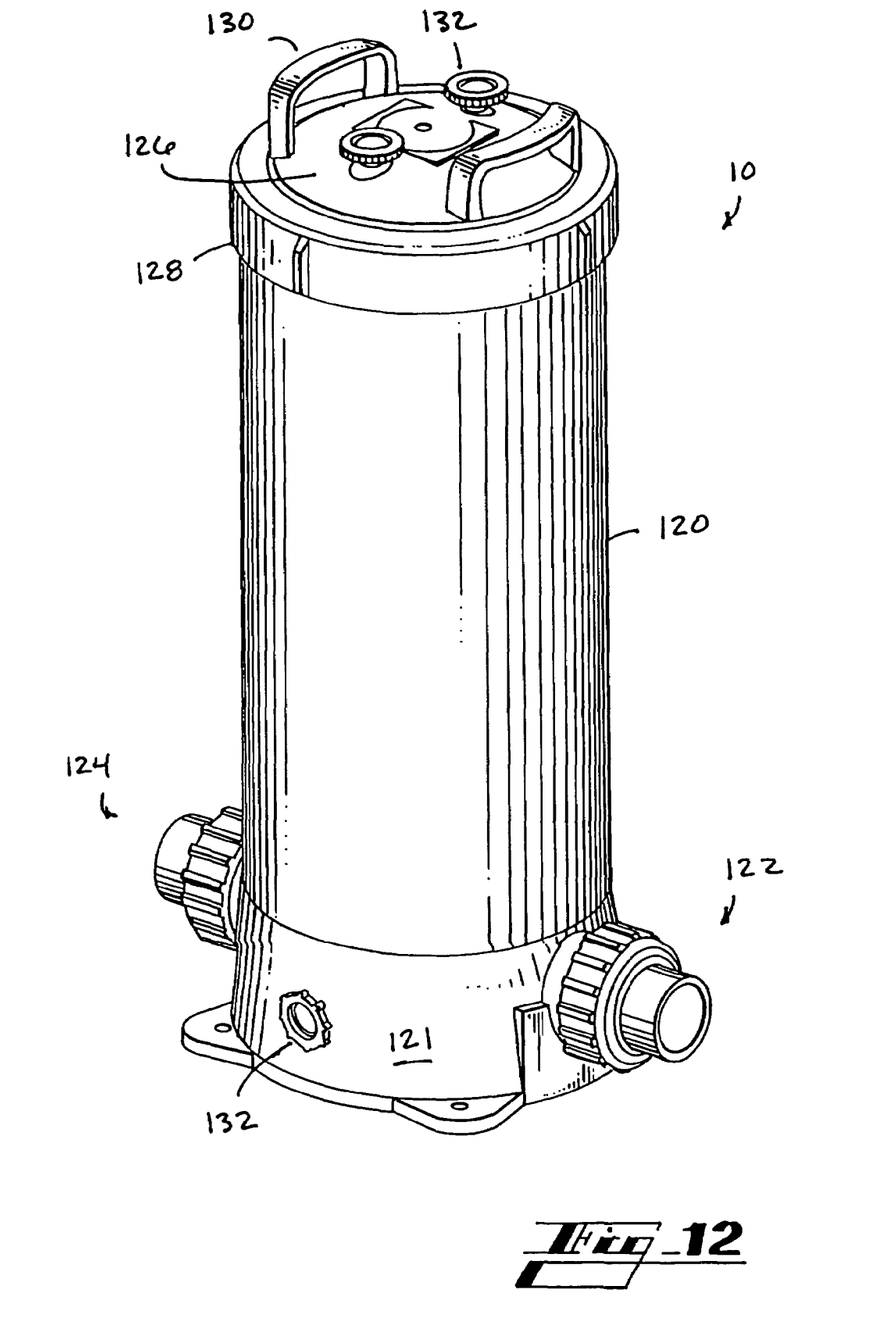
FIG. 12 is a front perspective view of another embodiment of the water purification apparatus in accordance with present invention.
Figure 13:
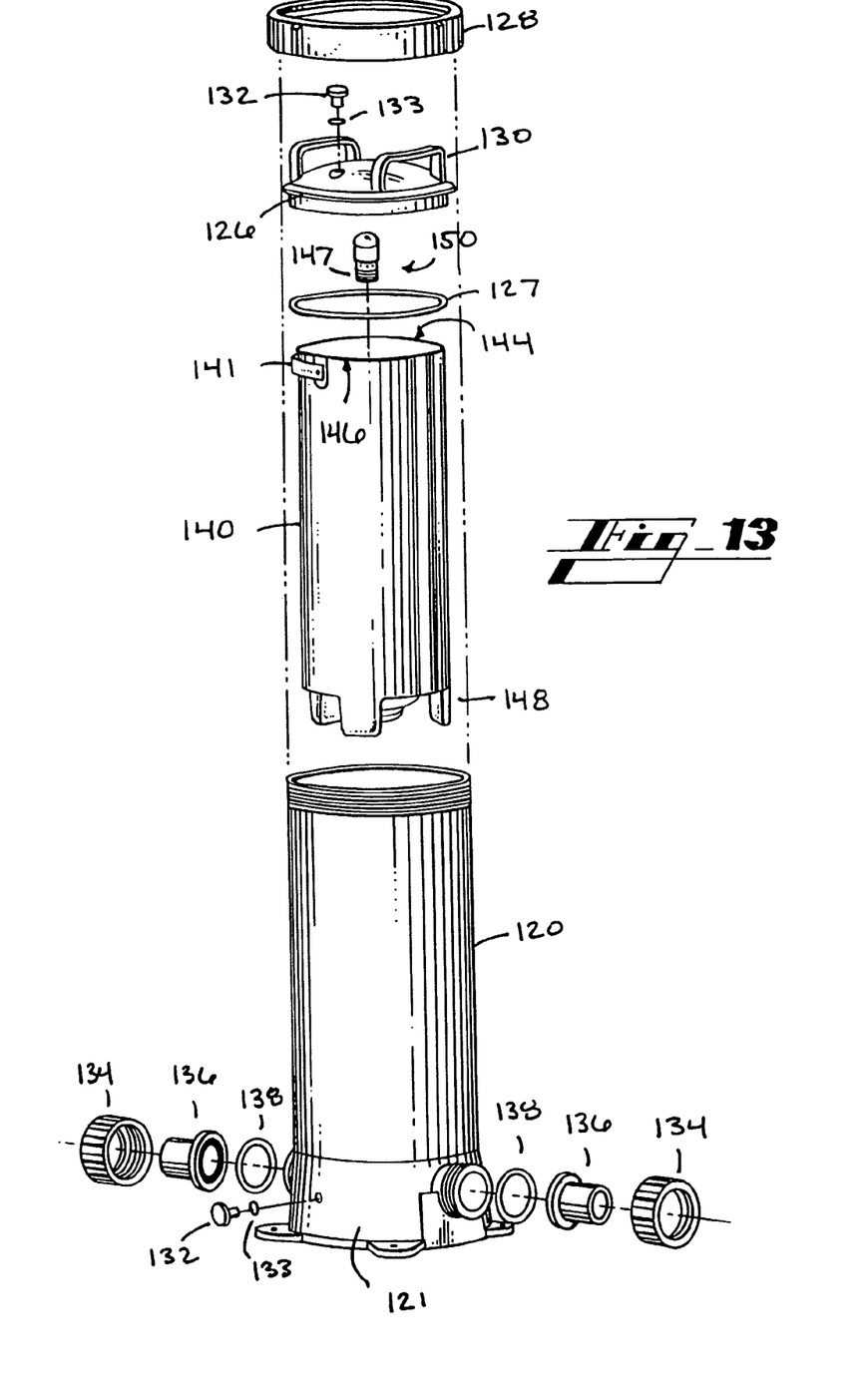
FIG. 13 is a side exploded view of another embodiment of the water purification apparatus in accordance with present invention.

FIGS. 12 and 13 show another embodiment of a water purification apparatus 10 in accordance with the present invention. The water purification apparatus 10 comprises a main housing 120 having a removable cover 126 and a lower basin 121, wherein the removable cover 126 has one or more handles 130 to facilitate lifting the cover 126. The cover 126 is fastened to the main housing 120 by a threaded cover ring 128 and a cover o-ring gasket 127. The top of the removable cover 126 includes one or more air bleed valves 132, each having a bleed valve o-ring gasket 133, for releasing pressure from within the water purification apparatus 10 when the removable cover 126 is fastened to the main housing 120. Another air bleed valve 132 may be provided in the basin 121 of the main housing 120. The water purification apparatus 10 further comprises a fluid inlet port 122 and a fluid outlet port 124, each being constructed of a lock nut 134, an adaptor connector 136, and a connector o-ring gasket 138.

As shown in FIG. 13, a removable hopper 140 is located inside the main housing 120. The hopper 140 is of molded plastic with an internal chamber 144 for containing chemical tablets 30, a top opening 146, and a lower footed portion 148 that fits within the basin of the main housing 120. A bail 141 is attached to the outside of the hopper 140 to facilitate lifting the hopper 142 out of the main housing 120 once the cover 126 is removed.

Figures 14, 15, 16:
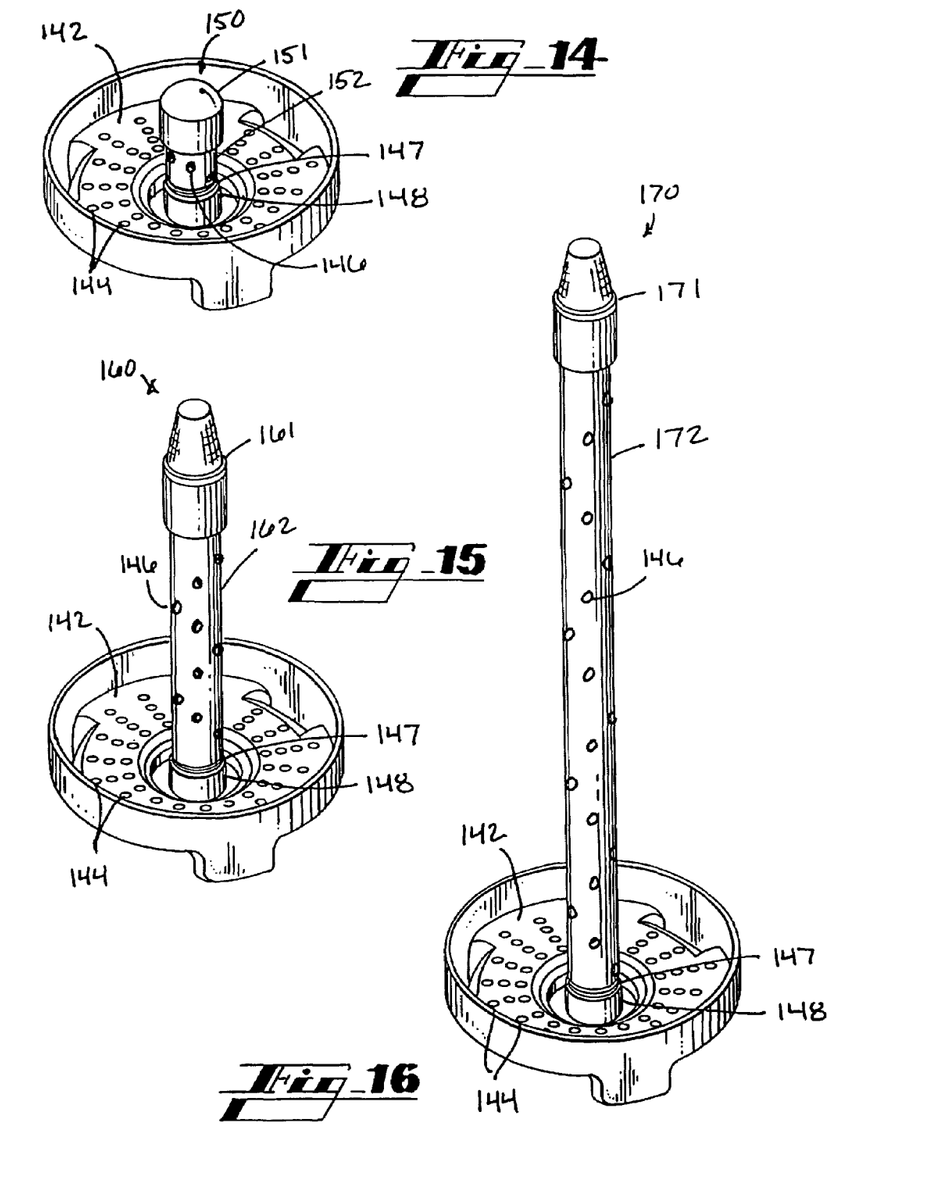
FIG. 14 is a perspective view of a first spray head design detachably connected to the perforated bed of another embodiment of the water purification apparatus in accordance with present invention.
FIG. 15 is a perspective view of another spray head design detachably connected to the perforated bed of another embodiment of the water purification apparatus in accordance with present invention.
FIG. 16 is a perspective view of yet another spray head design detachably connected to the perforated bed of another embodiment of the water purification apparatus in accordance with present invention.

With reference to FIGS. 14-16, a perforated bed 142 forms the bottom of the internal chamber 144 of the removable hopper 140. As previously described, the perforated bed 142 supports water dissolvable chemical tablets 30 which provide the chemical, typically chlorine, for addition to the body of water.

As shown in FIG. 14, in this embodiment of the present invention, the perforated bed 142, with perforations 144, has a spray head 150 detachably connected to the perforated bed 142 via male pipe threads 147 and a threaded female coupling 148. Specifically, the threaded female coupling 148 is molded into the center of the perforated bed 142, and the spray head 150 with its male pipe thread 147 is threadably connected to the female coupling 148 and thus to the perforated bed 142. Although various sized pipe threads may be used, the pipe threads 147 for the spray head 150 and the female coupling 148 of the present invention are typically sized one (1) inch N.P.T. It will be appreciated that other means of detachably connecting the spray head 150 to the perforated bed 142 may be employed, such as the use of a socket weld coupling or removable adhesive.

As also previously described, the spray head 150 has four horizontally directed spray nozzles 146 located around its periphery and is connected to the re-circulation system via a fluid inlet port 122. In operation, untreated water from the re-circulation system enters the water purification apparatus 10 under pressure through the inlet port 122. From the inlet port 122, the water ascends into the spray head 150 and through the spray nozzles 146. The water discharged from the spray nozzles 146 of the spray head 150 wets the chemical tablets 30, percolates through the perforations 144 of the perforated bed 142, and is collected in the basin 121 of the main housing 120. From the basin 121 of the main housing 120, the water flows back to the re-circulation system through the outlet port 124.

The spray head design 150 shown in FIG. 14 is constructed of a relatively short, one (1) inch SCD 40 nipple or bushing 152 having a cap 151 over its top end. The spray nozzles 146 are constructed by drilling holes into the periphery of the nipple 152.

With reference to FIGS. 15 and 16, other spray heads 160 or 170 having different designs may be detachably connected to the female coupling 148 of the perforated bed 142 in accordance with this embodiment of the present invention. The spray head 160, shown in FIG. 15, is constructed of a slightly longer pipe 162 having a cap 161 over its top end. Additional spray nozzles 146 are located around the periphery of the pipe 162. Yet another such spray head 170 is shown in FIG. 16. The spray head 170 is constructed of a relatively long pipe 172 having a cap 171 over its top end. The spray nozzles 146 are located around the periphery of the pipe 172.

The shorter spray head 150 is used to wet a limited region of chemical tablets adjacent to the perforated bed 142 and to deliver the chemical to the body of water by erosion of the tablets, as known in the art. The longer spray heads 160 and 170 are used to wet a greater portion of the chemical tablets 30 and to deliver the chemical to the body of water by both erosion and flooding of the tablets, as known in the art. It will be appreciated that various other spray head designs having a different number, shape, or angle of spray nozzles, or being constructed out of a different material, such as various metals or plastics, may be employed to discharge water into the chemical tablets in accordance with the present invention.

Because this embodiment of the present invention allows for the use of different spray head designs, the rate at which water is introduced to the dissolvable tablets 30, and thus the chemical output, is easily modified by replacing one spray head for another having a different number of spray nozzles or having spray nozzles of a different size or shape. Consequently, the hopper of the present invention may be used for delivering the proper concentration of a variety of water treatment chemicals. For example, the hopper of the present invention can be used to deliver calcium hypochlorite, BCDMH, TCCA, or any other treatment chemical known in the art by virtue of the hopper being adapted to receive various spray heads, wherein each spray head may have a design that is optimal for the particular chemical being delivered. Specifically, the shorter spray head 150 is well suited for use with calcium hypochlorite, the longer spray head 160 for use with TCCA, and the longest spray head 170 for use with BCDMH.

While this invention has been described with reference to preferred embodiments thereof, it is to be understood that variations and modifications can be affected within the spirit and scope of the invention as described herein and before and as described in the appended claims.

We claim:

1. A water purification system connected to a water re-circulation system associated with a body of water to be treated with chemicals that are supplied in the form of dissolvable tablets, the system comprising:

a basin connected to said water re-circulation system, and including an inlet port, and at least one rinse nozzle for receiving water from said recirculation system, and an outlet port for returning treated water to said recirculation system, and an overflow port for dispensing of water above a predetermined level in said basin;

a hopper overlying the basin and removable therefrom by lifting, said hopper including an internal chamber for containing the tablets in the hopper; and a perforated bed that forms the bottom of the internal chamber and supports dissolvable tablets in the hopper, the perforated bed including a water coupling fixed to the perforated bed and connected via said inlet port to the water re-circulation system for receiving water from the water re-circulation system; and a plurality of spray heads, each of which is detachably connectable to the coupling of the perforated bed for discharging the water into the tablets supported on the perforated bed, wherein each of said spray heads includes spray nozzles that are different in one or more of size, number and angle, the size, number and angle of spray nozzles being selected to dissolve tablets having different chemical compositions.

2. The system of claim 1, wherein each of said spray heads has a different length, and discharges the water in a direction parallel to the perforated bed.

3. The system of claim 2, including three elongated spray heads having progressively longer lengths for wetting dissolvable tablets formed of calcium hypochlorite, BCDMH and TCCA, respectively.

4. The system of claim 3, wherein each of the spray heads includes a plurality of spray nozzles distributed substantially uniformly along their lengths for discharging water into said dissolvable tablets at a plurality of heights.

5. The system of claim 1, wherein the perforated bed includes a substantially flat, plate-like member that supports said dissolvable tablets, and one-half of a screw-type coupling integrally formed in a center portion of said plate-like member, and wherein each of said spray heads includes one half of a screw-type coupling at one end that is detachably connectable to the coupling of the perforated bed via pipe threads.

6. The system of claim 5, wherein each of the plurality of spray heads includes a male pipe thread and the coupling of the perforated bed includes a female pipe thread.

7. The system of claim 1, wherein the perforated bed includes a substantially flat, plate-like member that supports said dissolvable tablets, and one-half of a screw-type coupling integrally formed in a center portion of said plate-like member, and wherein each of said spray heads includes one half of a screw-type coupling at one end that is detachably connectable to the coupling of the perforated bed via pipe threads, wherein said one-half of a screw-type coupling of said plate-like member is detachable to a water conduit extending from said basin by the application of a pulling force.

8. The system of claim 1, wherein the spray heads are formed from different materials.

9. The system of claim 1, wherein said basin includes said inlet port for admitting a flow of water from said water re-circulation system, and said rinse nozzle for discharging water into the basin, and wherein said inlet port is connected to said coupling of said perforated bed and said rinse nozzle.

10. The system of claim 9, wherein said basin further includes a float valve for controlling the level of water in the basin by controlling the flow of water from the inlet port through the rinse valve into the basin; and a discharge device for discharging water from the basin through said outlet port connected to the water system.

11. The system of claim 10, wherein said basin further includes said overflow port connected to a controlled discharge system and wherein the overflow port is positioned above a predetermined water level in the basin so that when the water level in the basin exceeds that predetermined water level, the water is discharged through the overflow port to a safe location.

12. A water purification system connected to a water re-circulation system associated with a body of water to be treated with chemicals that are supplied in the form of dissolvable tablets, the system comprising:

a basin connected to said water re-circulation system, and including an inlet port, and at least one rinse nozzle for receiving water from said recirculation system, and an outlet port for returning treated water to said recirculation system, and an overflow port for dispensing of water above a predetermined level in said basin;

a hopper overlying the basin and removable therefrom by lifting, said hopper including an internal chamber for containing the tablets in the hopper; and a perforated bed that forms the bottom of the internal chamber and supports dissolvable tablets in the hopper, the perforated bed including a substantially flat, plate-like member that supports said dissolvable tablets, and one-half of a screw-type coupling integrally molded in a center portion of said plate-like member; wherein said one-half of a screw-type coupling molded into said plate-like member is detachably connectable to a water conduit extending from said basin upon the application of a pulling force to said hopper, and a plurality of elongated spray heads of different lengths, wherein each of said spray heads includes one half of a screw-type coupling at one end that is detachably connectable to the one-half of a screw-type coupling of the perforated bed, wherein each of said spray heads includes spray nozzles distributed along its length that are different in one or more of size, number and angle, the length of the spray head and size, number and angle of spray nozzles being selected to dissolve tablets having different chemical compositions.

13. A water purification system connected to a water re-circulation system associated with a body of water to be treated with chemicals that are supplied in the form of dissolvable tablets, the system comprising:

a basin connected to said water re-circulation system that includes an inlet port for admitting a flow of water from said water re-circulation system, a rinse nozzle for receiving water from the recirculation system, and an outlet port for returning treated water to said recirculation system, and an overflow port for dispensing of water above a predetermined level in said basin;

a hopper overlying the basin and removable therefrom by lifting, said hopper including an internal chamber for containing the tablets in the hopper; and a perforated bed that forms the bottom of the internal chamber and supports dissolvable tablets in the hopper, the perforated bed including a substantially flat, plate-like member that supports said dissolvable tablets, and one-half of a screw-type coupling integrally molded in a center portion of said plate-like member; wherein said one-half of a screw-type coupling molded into said plate-like member is detachably connectable to a water conduit extending from said basin and connected to said inlet port upon the application of a pulling force to said hopper, and a plurality of elongated spray heads of different lengths, wherein each of said spray heads includes one half of a screw-type coupling at one end that is detachably connectable to the one-half of a screw-type coupling of the perforated bed, wherein each of said spray heads includes spray nozzles distributed along its length that are different in one or more of size, number and angle, the length of the spray head and size, number and angle of spray.

* * * * *